(No Model.)
J. W. STROTHER.
SHEEP SHEARS.
No. 448,557. Patented Mar. 17, 1891.
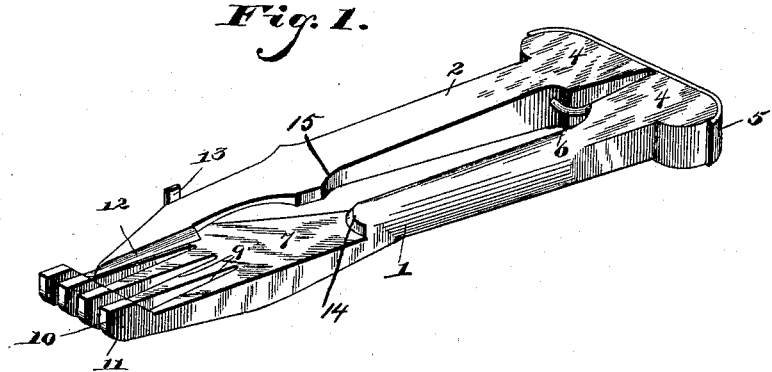
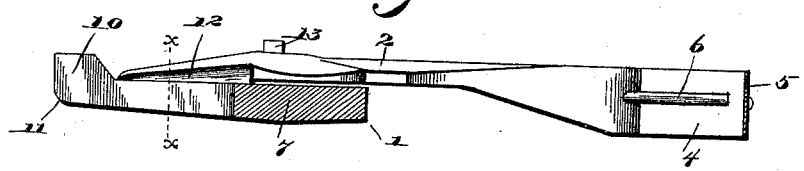
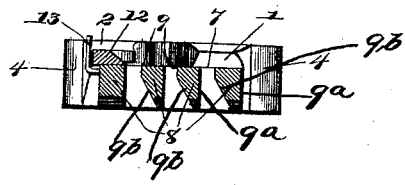
Witnesses
Samuel Kev.
Wm. Bagger
Inventor
John W. Strother
By his Attorneys,
C. A. Snow & Co.

UNITED STATES PATENT OFFICE.

JOHN W. STROTHER, OF CHERRY CAMP, WEST VIRGINIA.

SHEEP-SHEARS.

SPECIFICATION forming part of Letters Patent No. 448,557, dated March 17, 1891.

Application filed April 9, 1890. Serial No. 347,199. (No model.)

*To all whom it may concern:*

Be it known that I, JOHN W. STROTHER, a citizen of the United States, residing at Cherry Camp, in the county of Harrison and State of West Virginia, have invented new and useful Sheap-Shears, of which the following is a specification.

This invention relates to sheep-shears; and it has for its object to provide a device of this class which shall be simple in construction and efficient in operation, and which may be operated without danger of inflicting injury to the skin of the animal whose fleece is being cut.

With these objects in view the invention consists in the improved construction, combination, and arrangements of parts, which will be hereinafter fully described, and particularly pointed out in the claim.

In the drawings hereto annexed, Figure 1 is a perspective view of a pair of sheep-shears embodying my improvements. Fig. 2 is a longitudinal vertical sectional view of the same. Fig. 3 is a vertical transverse sectional view taken on the line $x\ x$ in Fig. 2.

Like numerals of reference indicate like parts in all the figures.

My improved shears are composed of the parts 1 and 2, each of which is provided with a shank having at its upper end a head 4. The heads 4 of the two members of the shears are connected in the usual manner by means of a flat spring 5, and an additional spring 6 may be interposed between the said members for the purpose of keeping them normally apart from each other.

The part or member 1 is provided with a flattened portion 7, having a series of tines 8. The number of these tines may vary; but four is deemed a suitable number, and this is the number which has been shown in the drawings hereto annexed. Said tines are perfectly level on the upper sides, and are beveled downwardly and inwardly, as will be clearly seen in Fig. 3 of the drawings, thus forming the sharp cutting-edges 9, the straight vertical sides $9^a$, and the inclined or beveled edges $9^b$. By this construction the beveled edges of the teeth or tines will press the fleece in one direction only—viz., toward the straight vertical side of the next adjacent tooth—thus lessening the liability of the fleece binding or wedging between the teeth and being torn out instead of being severed by the cutting action of the shears. The outer ends of the tines are provided with shoulders 10, having rounded or blunt points 11.

The part or member 2 of the shears is provided with a shear-blade 12, of ordinary construction, mounted to slide upon the flattened or enlarged portion 7 of the part 1, and to engage the tines 8 of the latter. A hook or catch 13, suitably attached to the parts 7 of the member 1, serves to limit the movement in an outward direction of the member 2 of the shears. To limit the movement in an inward direction of the shear-blade, I provide the member 1 of the device with a curved shoulder or abutment 14, and the member 2 with a curved shoulder 16, adapted to bear against said abutment, thus preventing the shear-blade passing beyond the edge of the outermost tooth or tine.

The operation and advantages of this invention will be readily understood from the foregoing description, taken in connection with the drawings hereto annexed.

The construction of the device is simple and inexpensive, and it is obvious that injury to the skin of the animal is rendered practically impossible during the operation of the device, owing to the fact that the point of the cutting-blade 12 is guarded by the shoulders or upturned outer edges of the tines 8. The under side of the part 7 of the member 1 of the shears is smooth and even, and the device may therefore be operated rapidly and efficiently, even by a practically unskilled operator, with satisfactory results.

Having thus described my invention, what I claim is—

The herein-described improved animal-shears, comprising, in combination, the shank 1, having the flattened portion 7, formed with tines 8, having flat upper sides, cutting-edges 9, straight vertical sides $9^a$, downwardly and inwardly beveled or inclined sides $9^b$, and shoulders 10, having blunt points 11, the shank 2, having the shear-blade 12, the connecting-spring 5, and the hook or stop 13, all constructed and arranged substantially as and for the purpose herein set forth.

In testimony that I claim the foregoing as my own I have hereto affixed my signature in presence of two witnesses.

JOHN W. STROTHER.

Witnesses:
E. B. ROBINSON,
D. C. J. BRAKE.